United States Patent [19]

Mizuno et al.

[11] Patent Number: 4,926,985
[45] Date of Patent: May 22, 1990

[54] OSCILLATING APPARATUS FOR DAMPING VIBRATION

[75] Inventors: Keiichiro Mizuno, Tokyo; Kazuyoshi Iida; Kazutomo Murakami, both of Yokohama, all of Japan

[73] Assignee: Bridgestone Corporation, Tokyo, Japan

[21] Appl. No.: 261,213

[22] Filed: Oct. 24, 1988

[30] Foreign Application Priority Data

Nov. 2, 1987 [JP] Japan .................. 62-275619

[51] Int. Cl.$^5$ .................. F16F 7/10; F16F 15/03; F16M 1/00
[52] U.S. Cl. .................. 188/378; 188/267; 267/136
[58] Field of Search ............ 188/378, 279, 267, 266; 267/136, 140.1; 92/8, 5 R

[56] References Cited

U.S. PATENT DOCUMENTS

| | | |
|---|---|---|
| 3,142,230 | 7/1964 | Bidlack . |
| 3,599,428 | 8/1971 | Chaney .................. 137/827 X |
| 3,612,222 | 10/1971 | Minor . |
| 3,917,246 | 11/1975 | Gartner . |

FOREIGN PATENT DOCUMENTS

| | | | |
|---|---|---|---|
| 0112440 | 8/1980 | Japan .................. | 188/267 |
| 0052602 | 5/1981 | Japan .................. | 92/8 |
| 0368432 | 1/1973 | U.S.S.R. .................. | 188/378 |
| 1282568 | 7/1972 | United Kingdom . | |

Primary Examiner—Robert J. Oberleitner
Attorney, Agent, or Firm—Sughrue, Mion, Zinn, Macpeak & Seas

[57] ABSTRACT

An oscillating apparatus comprises a cylinder, a piston reciprocatingly movably fitted in the cylinder, shaft members connected to the piston and extending out of the cylinder. The cylinder, piston and shaft members form an oscillator. An inlet and an outlet for an electro-rheological fluid are provided at each of two cylinder chambers defined in said cylinder by the piston. The apparatus further comprises voltage applying devices for applying electric voltage to the electro-rheological fluid passing through the inlets and outlets, respectively, so that applications of the voltage to the inlet of one cylinder chamber and the outlet of the other cylinder chamber are simultaneously effected and applications of the voltage to the inlets of both the cylinder chambers are alternately effected. With this arrangement, the switching-over of the closing and opening of the inlets and outlets are very rapidly performed by the application and removal of the electric voltage so that the piston undergoes vibration which is transmitted through the shaft members to an object, structure or the like, with the result that the object is controllingly vibrated and vibration to which the object is subjected is effectively damped.

8 Claims, 5 Drawing Sheets

FIG_1

FIG_2

FIG_6
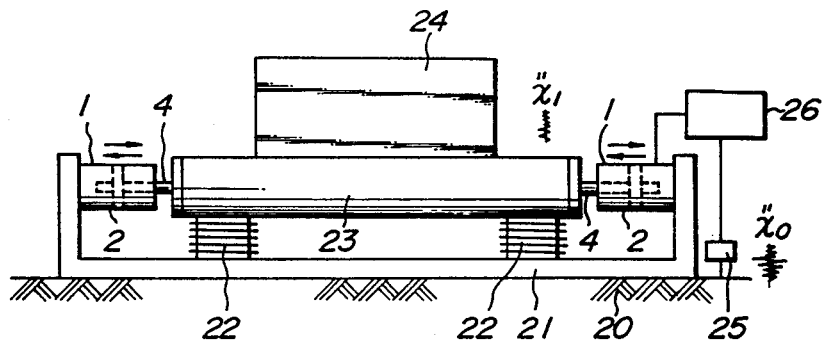
FIG_7
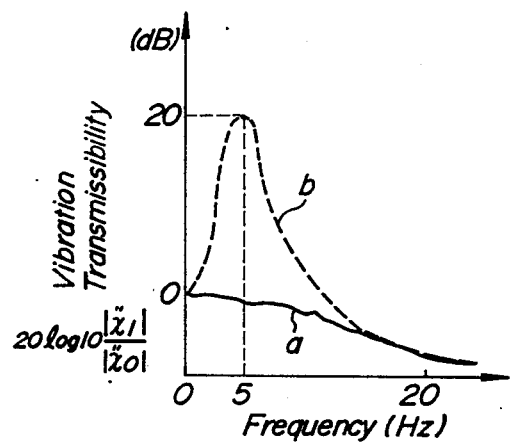
FIG_8
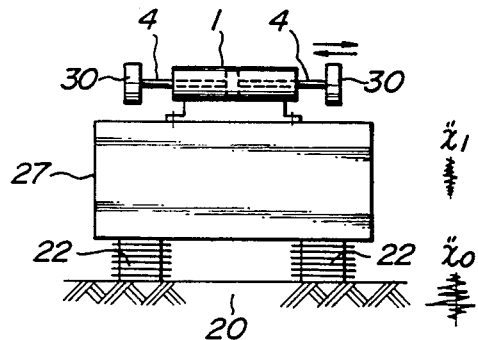

FIG_9
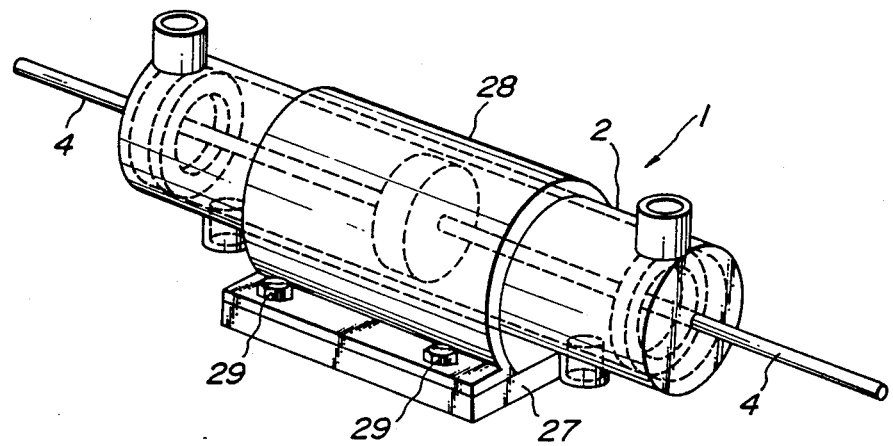
FIG_10
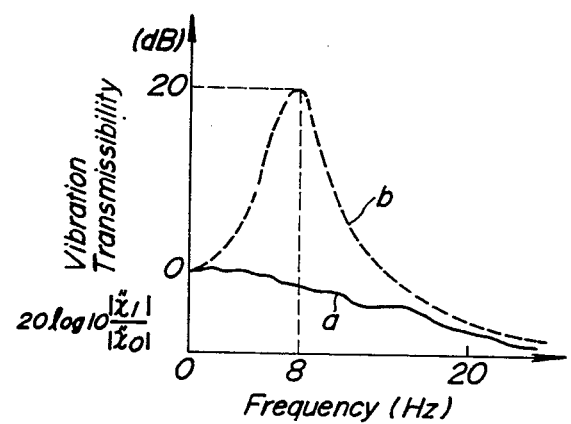

OSCILLATING APPARATUS FOR DAMPING VIBRATION

BACKGROUND OF THE INVENTION

This invention relates to an oscillating apparatus utilizing an electro-rheological fluid for damping vibration of an object.

Vibration externally acting upon, for example, bodies, structures and like and disturbing them can be damped by applying controlled oscillation opposing to the vibration to the bodies and the like. Such control is referred to "active vibration control". The above apparatus is effective to produce oscillation for the active vibration control.

For active vibration control, hydraulic or pneumatic piston and cylinder assemblies have been used as oscillators (actuators). With the assemblies, oil or air is alternately supplied into and exhausted from cylinder chambers formed on both sides of a piston to produce vibrational movements of the piston. The vibrational movements are transmitted to the bodies and the like as control vibration. In such hitherto used oscillating apparatus, the supply and exhaust of the oil or air for the cylinder chambers are effected by mechanically rapidly closing and opening various kinds of servo-valves. Therefore, servo-valve mechanisms are complicated and frequently cause trouble. Moreover, performance of the apparatuses gradually declines with lapse of used time.

On the other hands, electro-rheological fluids have been known which are substantially solidified when applying electric voltage.

SUMMARY OF THE INVENTION

It is an object of the invention to provide an improved oscillating apparatus for damping vibration, which eliminates all the disadvantages of the prior art and is simple in construction and miniaturized as entire system, durable in use and inexpensive to manufacture.

In order to accomplish the object, the oscillating apparatus according to the invention comprises a cylinder, a piston reciprocatingly movably fitted in the cylinder, shaft members connected to the piston and extending out of the cylinder, said cylinder, piston and shaft members forming an oscillator, an inlet and an outlet for an electro-rheological fluid provided at each of two cylinder chambers defined in said cylinder by the piston, and voltage applying means for applying electric voltage to the electro-rheological fluid passing through said inlets and outlets, respectively, so that applications of the voltage to the inlet of one cylinder chamber and the outlet of the other cylinder chamber are simultaneously effected and applications of the voltage to the inlets of both the cylinder chambers are alternately effected.

The electro-rheological fluid passing through the inlets and outlets is instantaneously solidified thereat when the electric voltage is applied to the fluid so that the fluid is stopped to close the inlets and the outlets. Upon removing the voltage, the electro-rheological fluid instantaneously becomes fluid to start flowing again so that the inlets and the outlets are opened.

The closing and opening of the inlets and the outlets by applying and removing the electric voltage as above described are carried out in the following manner. The inlet of one cylinder chamber and the outlet of the other cylinder chamber form a couple and are simultaneously closed and opened, and two couples of the inlet and outlet are alternately closed and opened. As a result, when the inlet of one cylinder chamber is opened and the electric-rheological fluid is flowing into the chamber through the inlet, the outlet of the chamber is closed to cause fluid pressure in the chamber. At this instant, the inlet of the other cylinder chamber is closed and the outlet is opened so that the fluid in the other cylinder chamber is exhausted and hence the piston is moved onto the other fluid chamber side. At a next instant, the closed and opened condition of the inlets and outlets is reversed, fluid pressure is caused in the other fluid chamber, while the fluid in the one chamber is exhausted. In this manner, the piston is alternately urged from both the sides and reciprocatingly moved. The switching-over of the closing and opening of the inlets and outlets are very rapidly performed by the application and removal of the electric voltage so that the piston undergoes vibration which is transmitted through the shaft members to an object, structure or the like, with the result that the object is vibrated.

In order that the invention may be more clearly understood, preferred embodiments will be described, by way of example, with reference to the accompanying drawings.

BRIEF DESCRIPTION OF THE DRAWINGS

FIG. 6 is a front elevation illustrating one example of the vibration control by the oscillator shown in FIG. 1;

FIG. 7 is a graph illustrating the damping effect in the arrangement shown in FIG. 6;

FIG. 8 is a front elevation illustrating another example of the vibration control by the oscillator shown in FIG. 1;

FIG. 9 is an enlarged perspective view of the oscillator shown in FIG. 8; and

FIG. 10 is a graph illustrating the damping effect in the arrangement shown in FIG. 8.

DESCRIPTION OF THE PREFERRED EMBODIMENTS

Figure 1:
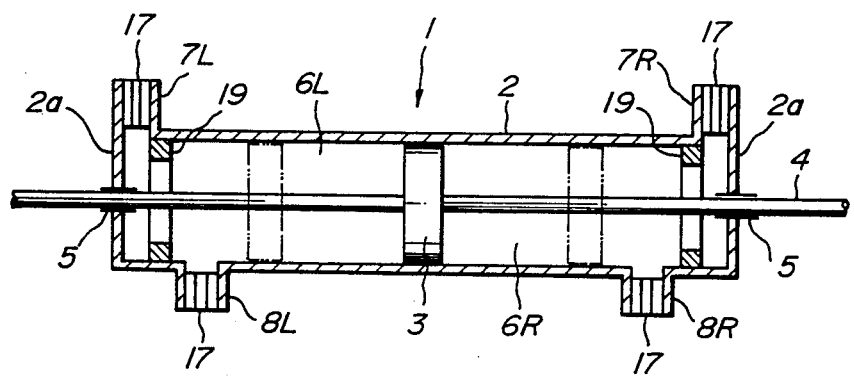
FIG. 1 is a longitudinal sectional view of an oscillator constituting the oscillating apparatus according to the invention.

FIG. 1 is a longitudinal sectional view of a oscillator 1 constituting the oscillating apparatus according to the invention. This oscillator 1 comprises a cylinder 2 and a piston 3 provided reciprocatingly movably in the cylinder 2. To the piston 3 are connected shaft members 4 which slidably extend through end walls 2a and bearings 5 provided in the end walls 2a and further extends out of the cylinder 2. The cylinder 2 is divided by the piston 3 into two cylinder chambers 6L and 6R on the left and right sides. The cylinder chamber 6L is provided with an inlet 7L and an outlet 8L for an electro-rheological fluid and the other cylinder chamber 6R is also provided with an inlet 7R and an outlet 8R.

Figure 2:
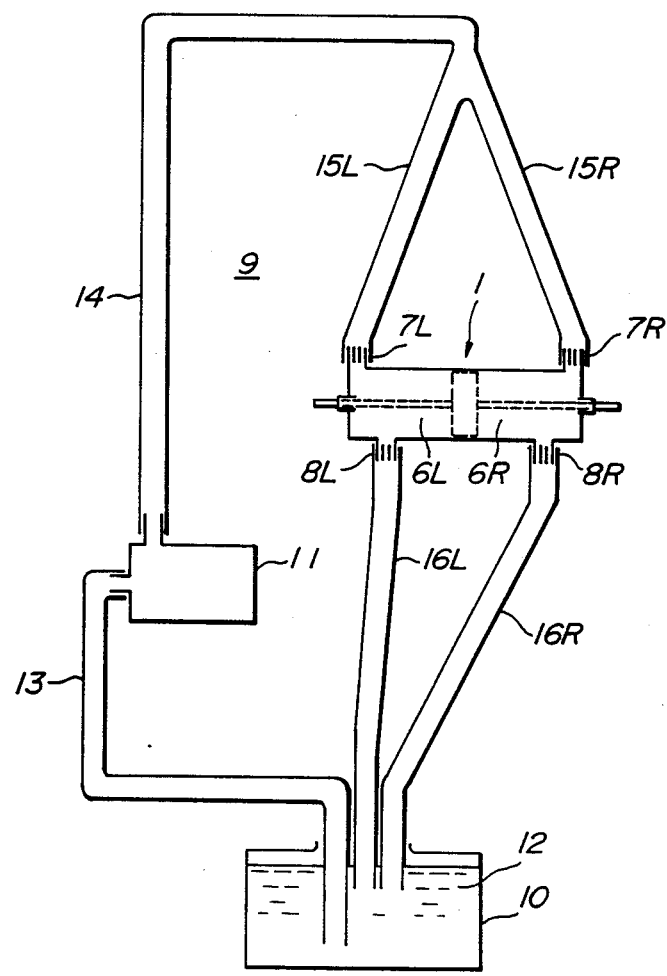
FIG. 2 is an electro-rheological fluid circuit including the oscillator shown in FIG. 1.

This oscillator 1 is interposed in the electro-rheological fluid circuit 9 as shown in FIG. 2. Referring to FIG. 2, the fluid circuit 9 comprises a fluid reservoir 10 for storing the electro-rheological fluid 12, and a pump 11 for delivering the fluid 12 in the reservoir 10 through a suction pipe 13 into a delivery pipe 14. The delivery pipe 14 is branched into two inlet pipes 15L and 15R respectively connected to the inlets 7L and 7R of the oscillator. The outlets 8L and 8R of the oscillator 1 are communicated through outlet pipes 16L and 16R with the reservoir 10, respectively.

The electro-rheological fluid 12 is a fluid mixture of a synthetic oil, water and high-molecular fine particles. This is a low viscous fluid under normal condition, but when electric voltage is applied to this fluid, the viscosity increases with the voltage and again decreases as the voltage is removed. The variation in the viscosity is fairly large and proportional to the applied voltage. This variation in state or condition is reversible and instantaneous.

Figure 3:
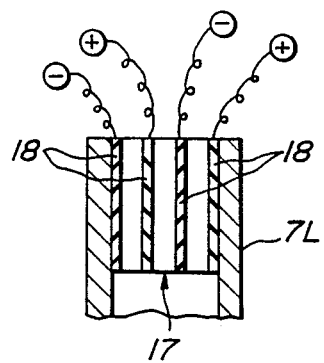
FIG. 3 is an enlarged view of a part of the oscillator shown in FIG. 1.

The supply and exhaust of the electro-rheological fluid 12 flowing into and from the cylinder chambers 6L and 6R of the oscillator 1 is effected utilizing this property of the electro-rheological fluid 12. For this purpose, there are provided at the inlets 7L and 7R and the outlets 8L and 8R voltage applying means for applying voltage to the electro-rheological fluid 12 flowing through these inlets and outlets. FIG. 3 illustrates one example of the voltage applying means 17 provided at the inlet 7L comprising four electrodes 18 arranged spaced apart from each other in parallel with directions of the flow of the electro-rheological fluid 12 and alternately connected to positive and negative terminals of a DC source in a manner freely switching on and off. The electrodes 18 are made of a metal, for example, stainless steel or the like.

When each electrode 18 is not connected with the power source, there is no electrical voltage between the electrodes 18 so that the change in the state does not occur in the electro-rheological fluid passing therethrough and therefore the fluid freely passes through the inlet 7L. In other words, the inlet 7L is kept opened. However, when the respective electrodes 18 are connected to the power source to apply voltage, for example, of the order of 4–5 KV between the electrodes, the electro-rheological fluid flowing between the electrodes 18 is instantaneously solidified to close the inlet 7L. In other words, the inlet 7L is kept closed. The voltage applying means 17 serves as a valve for closing and opening the inlet 7L. Such a valve function is thus very quickly obtained simply by switching on and off the electrical current without requiring any mechanical operation.

Other voltage applying means 17 similar to the above voltage applying means are also provided at the other inlet 7R and the outlets 8L and 8R. The electrode 18 of the voltage applying means 17 of the inlet 7L and the electrode 18 of the voltage applying means 17 of the outlet 8R are adapted to be simultaneously switched on or connected to and simultaneously switched off or disconnected from the power source. In other words, the inlet 7L and outlet 8R are adapted to be simultaneously closed and opened. In the same manner, the inlet 7R and the outlet 8L are also adapted to be simultaneously closed and opened. Moreover, the closing and opening of the inlet 7L and the outlet 8R and the closing and opening of the inlet 7R and the outlet 8L are adapted to be alternately effected at a predetermined period.

Therefore, the electro-rheological fluid is alternately supplied into the cylinder chambers 6L and 6R through their inlets 7L and 7R, respectively. At this instant, the electro-rheological fluid in the cylinder chambers on opposite side is exhausted through the outlets 8L and 8R and the outlet pipes 16 into the reservoir 10. As a result, the piston 3 is reciprocatingly moved or oscillated in an axial direction of the cylinder 2 by the pressure difference between the cylinder chambers 6L and 6R. This oscillation is extracted through the shaft member 4 to the exterior of the apparatus to be transmitted to the object, structure or the like connected to the shaft member 4 as oscillating force for damping vibration. Stoppers 19 are provided at both ends of the cylinder 2 to prevent any excess movement of the piston 3 at its extreme stroke ends.

Figure 4:
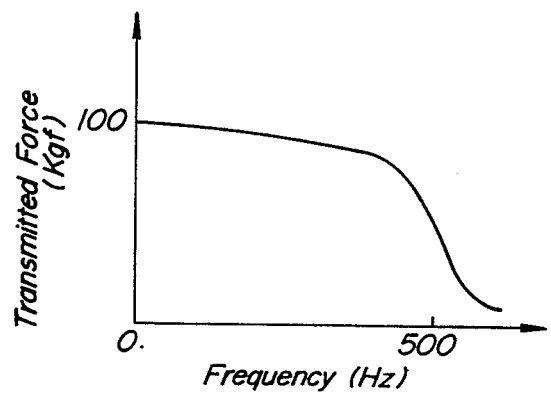
FIGS. 4 and 5 are graphs illustrating frequency characteristics of the oscillator shown in FIG. 1.
Figure 5:
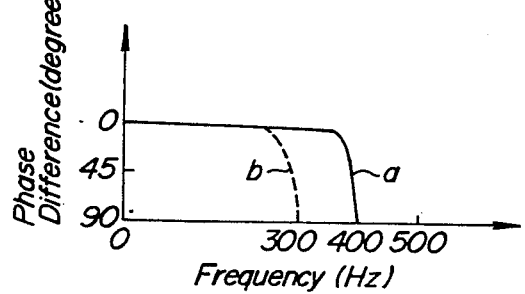

FIG. 4 and 5 illustrate one example of frequency characteristics of the oscillating apparatus according to the invention. FIG. 4 shows the relationship between the frequency and the transmitted force transmitted through the shaft member 4 and FIG. 5 illustrates the relationship between the frequency and phase difference between the phase of the electric voltage applied by the voltage applying means 17 and the phase of oscillation transmitted through the shaft member 4. From these graphs, it is clear that the oscillating apparatus according to the invention is able to generate oscillation over the high frequency range, and phase delay is little, if at all, in the operation of the apparatus. In FIG. 5, a solid line a shows the characteristics in an unloaded condition and a broken line b shows the characteristics in a loaded condition.

FIG. 6 illustrates one example of the oscillating apparatus according to the invention applied for preventing a body supported by laminated rubbers from horizontally vibrating. A base 23 is arranged through the laminated rubbers 22 on an external frame 21 seated on a ground 20. The oscillators 1 above described extending in the horizontal direction are mounted between both the ends of the base 23 and both the ends of the external frame 21, respectively. In each oscillator 1 of FIG. 6, however, the respective shaft member 4 extends only in one direction out of the cylinder 2 and is connected to the base 23, and the cylinder 2 is connected to the external frame 21.

When the ground 20 undergoes vibration as shown by $\ddot{X}_0$ in horizontal direction due to an earthquake or the like, this vibration $\ddot{X}_0$ is detected by a detector 25 to produce a detected signal which is fed to control means 26. In response to the detected signal, the control means 26 controls the voltage being applied to the inlets 7L and 7R and outlets 8L and 8R to cause vibration of the oscillator 1 having a phase reverse to that of the vibration $\ddot{X}_0$. The vibration of the oscillator 1 is transmitted to the base 23 through the shaft member 4 so that the vibration $\ddot{X}_0$ transmitted from the ground 20 to the base 23 and a load 24 is canceled. As a result, vibration $\ddot{X}_1$ of the base 23 and the load 24 is considerably damped in comparison with the vibration $\ddot{X}_0$. In this case, as an alternative, after the vibration $\ddot{X}_1$ of the base 23 is detected to produce a detected signal, voltage to be applied may be controlled by the control means 26 in response to the detected signal.

FIG. 7 illustrates a result obtained by such positive vibration control. In the graph, an abscissa indicates frequency and an ordinate shows vibration transmissibility $20 \log \{|\ddot{X}_1|/|\ddot{X}_0|\}$. A solid line a indicates the results of the case that the positive vibration control is carried out, and a broken line b shows the result of the case that the oscillators 1 are inoperative without applying voltage to the oscillators 1. In the case of the oscillators 1 being inoperative, resonance occurred at frequency of 5 Hz.

FIG. 8 illustrates another example of the vibration control utilizing the oscillator 1 according to the invention. In this example, a body 27 is supported through laminated rubbers 22 on a ground 20 and the oscillator 1 is mounted on the body 27. As shown in FIG. 9, the cylinder 2 of the oscillator 1 is embraced by a retaining metal 28 which is fixed to the body 27 by means of bolts 29 so that the oscillator 1 is mounted on the body 27. Weights 30 are fixed to free ends of the shaft members 4 extending from both the ends of the cylinder 2 (FIG. 8).

In the same manner as in the example of FIG. 6, the horizontal vibration $\ddot{X}_0$ of the base 20 or the horizontal vibration $\ddot{X}_1$ of the body 27 is detected, and in response to this detection, voltage to be applied is controlled to vibrate the weights 30 with suitable frequencies and phases. As a result, the weights 30 positively function as mass dampers to reduce the vibrations of the body 27. FIG. 10 is a graph, similar to FIG. 7, illustrating a result of the case employing the vibration control of such an active mass damper system. It is clear that the embodiment shown in FIG. 8 can bring about the great vibration damping effect similar to that in FIG. 6. In the embodiment shown in FIG. 8, if the oscillator 1 is kept inoperative, resonance occurs in vicinity of frequency of 8 Hz.

As can be seen from the above description, the oscillating apparatus according to the invention utilizing the electro-rheological fluid to perform the closing and opening the fluid inlets and outlets of the cylinder chambers by applying and removing the electric voltage. Therefore, the exchanging of fluid supply and exhaust for two cylinder chambers is very quickly effected and so that even vibration of high frequency can be easily obtained.

As any mechanical valve means is not needed, the oscillating apparatus according to the invention is very simple in construction and miniaturized as entire system in comparison with oscillating apparatuses of the prior art using oils and air as operating fluids. Moreover, the apparatus according to the invention is very advantageous in durability, cost and the like.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An oscillating apparatus comprising: a cylinder, a piston reciprocatingly movably fitted in the cylinder, shaft members connected to the piston and at least one shaft member extending out of the cylinder, said cylinder, piston and shaft members forming an oscillator, said oscillator arranged on an object to be damped which is supported through laminated elastic members on a base, and weights are fixed to ends of the shaft members extending out of the cylinder, an inlet and an outlet for an electro-rheological fluid provided at each of two cylinder chambers defined in said cylinder by the piston, and voltage applying means for applying electric voltage to the electro-rheological fluid passing through said inlets and outlets, respectively, so that applications of the voltage to the inlet of one cylinder chamber and the outlet of the other cylinder chamber are simultaneously effected and applications of the voltage to the inlets of both the cylinder chambers are alternately effected.

2. An oscillating apparatus as set forth in claim 1, wherein said voltage applying means comprises four electrodes arranged spaced apart from each other in parallel with directions of flow of the electro-rheological fluid and alternately connected to positive and negative terminals of a DC source.

3. An oscillating apparatus as set forth in claim 1, wherein said oscillator is interposed in an electro-rheological fluid circuit comprising a fluid reservoir for storing the electro-rheological fluid, a pump for delivering the fluid in the reservoir through a suction pipe into a delivery pipe which is branched into two inlets pipes respectively connected to said inlets of both the cylinder chambers, and two outlet pipes respectively connected to the outlets of both the cylinder chambers and communicating with said the fluid reservoir.

4. An oscillating apparatus as set forth in claim 1, wherein there are provided two oscillators which are respectively connected between ends of an external frame and both ends of a base which is supported by laminated elastic members on the external frame and supporting an object to be damped, the cylinder and the shaft member of each of the oscillators being connected to the external frame and the base.

5. An oscillating apparatus as set forth in claim 1, wherein the apparatus comprises a detector for detecting vibration to produce a detected signal, and control means for controlling electric voltage to be applied to said inlets and outlets in response to the detected signal.

6. An oscillating apparatus as set forth in claim 1, wherein the cylinder of the oscillator is embraced by a retaining metal which is fixed to the object.

7. An oscillating apparatus comprising: a cylinder, a piston reciprocatingly movably fitted in the cylinder, shaft members connected to the piston and at least one shaft member extending out of the cylinder, said cylinder, piston and shaft members forming a first oscillator, a second oscillator, said first and second oscillators respectively connected between ends of an external frame and both ends of a base which is supported by laminated elastic members on the external frame and supporting an object to be damped, the cylinder and the shaft member of each of the oscillators being connected to the external frame and the base, an inlet and an outlet for an electro-rheological fluid provided at each of two cylinder chambers defined in said cylinder by the piston, and voltage applying means for applying electric voltage to the electro-rheological fluid passing through said inlets and outlets, respectively, so that applications of the voltage to the inlet of one cylinder chamber and the outlet of the other cylinder chamber are simultaneously effected and applications of the voltage to the inlets of both the cylinder chambers are alternately effected.

8. An oscillating apparatus as set forth in claim 7, wherein the oscillator is arranged on an object to be damped which is supported through laminated elastic members on a base, and weights are fixed to ends of the shaft members extending out of the cylinder.

* * * * *